Feb. 11, 1930.  W. C. WRENN ET AL  1,746,508
AUTOMOBILE HEADLIGHT
Filed Aug. 13, 1928

Inventors
Walter C. Wrenn,
Elbert Earl Neeley.
By D. O'Brien
Attorney

Patented Feb. 11, 1930

1,746,508

UNITED STATES PATENT OFFICE

WALTER C. WRENN AND ELBERT EARL NEELEY, OF LONGMONT, COLORADO

AUTOMOBILE HEADLIGHT

Application filed August 13, 1928. Serial No. 299,268.

This invention relates to improvements in the construction of automobile headlights for use in connection with lighting systems for automobiles.

Automobiles as at present constructed are provided with two headlights which are rigidly secured to the chassis and which are adjusted to throw the light forwardly upon the road surface. It is often desirable to be able to light up either side of the road and this is true especially in turning from one road to another. With the present automobile illumination it is not possible to illuminate the road onto which the driver is about to turn until after the turn has been made, and this often results in accidents due to the fact that there may be obstructions which are invisible to the driver until after it is too late to avoid them.

It is the object of this invention to provide an auxiliary headlight that can be attached to an automobile and used in addition to the regular headlight equipment and which shall be so constructed that it will cast a beam of light to either side of the road at an angle to the direction of travel or which can even be used to simultaneously direct light to the opposite sides of the road.

This invention, briefly described, consists in a lamp having a compound reflector formed from two reflectors that are of the ordinary parabolic shape, but which are arranged so that their optical axes lie in the same plane and intersect each other in a point lying in a vertical plane with respect to which the two reflector portions are symmetrical. Each of the reflector portions is provided with a lamp located with its filament adjacent the focal point and which can be controlled either by a manually operated switch or by means of a special switch connected with the steering gear and so arranged that it will light one of these lamps when the automobile is turned in one direction and the other lamp when the automobile is turned in the opposite direction.

In order to more clearly describe this invention so that its construction and its operation will be readily understood, reference will now be had to the accompanying drawings in which the preferred embodiment of this invention has been illustrated, and in which.

Figures 1, 2, 3, 4, 5, 6, 7:
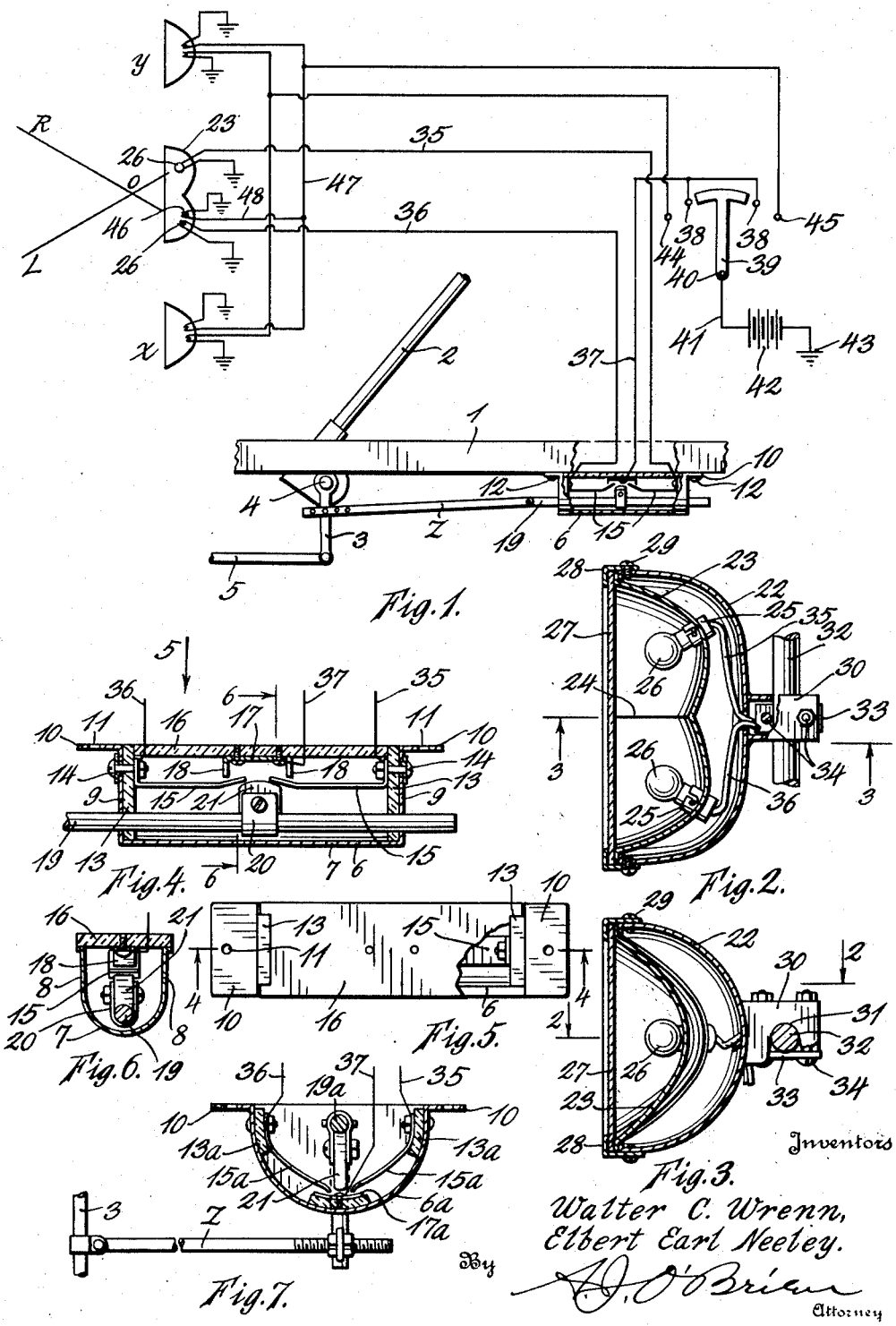
Fig. 1 is a diagrammatic view showing the improved duplex headlight located between the two ordinary headlights and shows the method of wiring the different headlights and of controlling them.
Fig. 2 is a horizontal section through the improved headlight taken on line 2—2, Fig. 3.
Fig. 3 is a section through the headlight taken on a vertical plane 3—3, Fig. 2.
Fig. 4 is a vertical longitudinal section through the preferred form of switch mechanism, this section being taken on line 4—4, Fig. 5.
Fig. 5 is a top plan view of the switch looking in the direction of arrow 5 in Fig. 4, parts being broken away to better disclose the construction.
Fig. 6 is a section taken on line 6—6, Fig. 4.
Fig. 7 is a view similar to that shown in Fig. 4 of a modified form of switch construction.

In the drawings reference numeral 1 represents a member of the chassis frame and 2 the steering post switch, when rotated causes the steering arm 3 to be oscillated about its pivot 4. A connecting rod 5 has one end pivoted to the steering rod at 6 and has the other connection with the steering mechanism in the usual manner. Secured to the under side of one of the side members 1 is a switch mechanism which comprises a casing 6 having a rounded bottom 7 and spaced vertical sides 8. This casing is also provided with end walls 9 whose upper ends are turned outwardly so as to form ears 10 that are perforated at 11 for the reception of bolts or screws 12 by means of which the casing is secured to the chassis frame. Secured to the inside of ends 9 are members 13 of insulating material which are held in place by means of bolts 14. Switch contacts 15 are secured to the inner surfaces of members 13 and are held in place by means of the bolts 14. These switch contacts extend inwardly towards the center of the switch casing and are separated from each other in the manner shown in Fig. 4. The bolts 14 are, of course, insulated from the ends 9 of the casing, by means of insulating washers in the usual manner. The opening into the switch casing is closed by means of an insulating plate 16, whose ends are notched as shown in Fig. 5 for the reception of the insulating members 13. Secured to the under side of member 16 is a switch contact 17 having its ends 18 bent downwardly so as to terminate a short distance above the switch contacts 15. Contact member 17 is secured to member 16 by means of screws in the manner shown. A rod 19 extends through the ends 9 and through the insulating members 13 and is mounted for reciprocation. Secured to rod 19 by means of a clip 20 is an insulating member 21 that engages the under surface of switch contacts 15, when the rod 19 is moved away from its center. Whenever rod 19 is reciprocated in either direction one of the other of the switch contacts 15 is moved into electrical contact with one of the downwardly projecting members 18.

The lamp comprises a lamp housing 22, within which is located a duplex reflector formed of two similar reflector sections 23 that are parts of parabolic reflectors of the usual construction. The optical axes of these reflectors lie in the same plane and intersect each other at point O which lies in a vertical plane with respect to which the reflector sections are symmetrical. The reflector sections are connected along line 24 and are each provided with a socket 25 in which is located a lamp 26. The socket and the lamp are of the usual type employed in connection with automobile headlights. A lens 27 is located in front of the duplex reflectors and is held in place by means of a ring 28 that is secured to the housing 22 by means of a screw 29. The headlight housing is provided with a rearwardly extending bracket 30 whose sides have notches 31 which are adapted to receive the rod 32 that usually connects the ordinary headlights of an automobile. A clamping member 33 is located beneath the rod 32 and is held in place by means of bolts 34 that can be tightened to any extent desired and which serve to hold the headlight in place. One terminal of lamps 26 is usually grounded in the usual manner and from the lamps electrical conductors 35 and 36 extend to the contacts 15 of the switch in the manner shown in Fig. 1. From the center contact 17 a conductor 37 extends to the lighting switch and is electrically connected with the two spaced switch contacts 38. The lighting switch which has been illustrated for the purpose of explaining the control is provided with a movable switch contact 39 that is pivoted at 40 and is connected by means of a wire 41 with the battery 42. The other pole of this battery has been shown as grounded at 43. It is now evident that if the movable switch contact 39 is moved in either direction so as to make electrical connection with either one of the contacts 38 that this will connect the switch contact 17 with one pole of the battery and therefore whenever either one of the contacts 15 is brought into electrical contact with the switch contact 17, current will flow through the corresponding conductor 35 or 36, to one of the lamps 26 in the duplex headlight. The wires have been so connected that when the steering gear is operated to turn the machine towards the right, the lamp 26 in the lefthand reflector will become operative and throw a beam of light in the general direction of line O R in Fig. 1 and when the automobile is turned towards the left the lamp 26 in the righthand reflector of the duplex headlight will be lighted and throw a beam of light in the general direction of line O L. It will thus be seen that when the automobile is turned towards the right, the auxiliary headlight will become effective so as to throw a beam of light towards the righthand side of the road and when the automobile is turned to the left it will throw a beam of light towards the left of the road. When the automobile is going straight ahead, neither one of the lamps in the auxiliary headlight will be lighted and therefore there can be no objectionable glare produced. When the auxiliary headlight throws a light towards the right of the road, this light will, of course, not interfere with approaching traffic as they are on the left of the road, and since light is never thrown towards the left of the road except when making a lefthand turn, in which case the driver who is making the turn, as well as the driver of an approaching car, must exercise extreme care so as to prevent accidents and if any glare is produced this is only of momentary duration.

In Fig. 1 we have shown the ordinary headlights with which automobiles are usually equipped. These headlights have been indicated by letters X and Y, and have been shown as having their high light filaments connected with the switch contact 44 and their low light filaments connected with the switch contact 45. It is obvious, therefore, that when switch contact 39 is moved so as to make electrical connection with contacts 44 and 38, that the headlights X and Y will be operating at full intensity, while if this switch contact is thrown towards the right so as to contact with contacts 45 and 38, the headlights X and Y will be dim. It is, of course, possible to provide the auxiliary headlight with dim and bright lights as well as the ordinary headlights, but as no advantage is apparent from providing the auxiliary headlight with dimmers, it has not been shown in this application.

In Fig. 7 a modified switch construction has been shown in which the casing 6ᵃ is semicircular and is provided with ears 11ª. Switch contacts 15ª are secured to the casing and insulated from the latter by means of insulating members 13ª. This switch is provided with a center contact 17ª and has rotatably secured to the end walls 9ª a shaft 19ª, which carries an insulating block 21ª, which can be moved into contact with either one of the switch contacts 15ª whenever the rod Z is moved backwardly or forwardly. It will be seen that the switch shown in Fig. 7 is the exact duplicate of the one shown in Fig. 4 as far as function is concerned, and that the difference consists in the substitution of a rotary shaft 19ª for the reciprocating shaft 19 of the other switch.

From the above description it will be apparent that there has been disclosed an automobile lighting system by means of which a light is thrown to that side of the road to which the automobile is being directed, as well as a headlight of a peculiar construction that will throw beams of light in different directions, either simultaneously or independently as may be desired.

When the headlights $x$ and $y$ are dimmed, it is, of course, desirable to light up the right hand side of the road and this is effected by employing a double filament lamp in the left hand compartment of the auxiliary headlight; these filaments are both of the same candle power and the one indicated by numeral 46 is connected to wire 47 by means of a wire 48 and is therefore in parallel with the low power filaments of the headlights $x$ and $y$, so that whenever the headlights are dimmed, a strong light will be directed to the right of the road and the driver will thus see this side as well as if the headlights were on bright.

Having described the invention what is claimed as new is:

A headlight reflector comprising two paraboloidal reflectors, the open ends of each of which lies in two planes that intersect each other at right angles and which are inclined at different angles to the optical axis, both of said planes being spaced from the focal point, the edges of the reflectors that lie in the planes which intersect the optical axes farthest from the focal points being connected whereby a unitary compound reflector is produced which has two spaced focal points and converging intersecting axes.

In testimony whereof we affix our signatures.

WALTER C. WRENN.
ELBERT EARL NEELEY.